United States Patent [19]

Shafranovsky et al.

[11] 4,198,360
[45] Apr. 15, 1980

[54] APPARATUS FOR HEAT-MASS EXCHANGE PROCESSES WITH PARTICIPATION OF LIQUID

[76] Inventors: Alexandr V. Shafranovsky, Balashikha, Molodezhnaya ulitsa, 4, kv. 7, Moskovskaya oblast; Viktor M. Olevsky, Leningradsky prospekt, 75-a kv. 91, Moscow; Vladimir K. Chubukov, Komsomolsky prospekt 41, kv. 97, Moscow; Jury A. Baskov, shosse Entuziastov 156, kv. 20, Moscow, all of U.S.S.R.

[21] Appl. No.: 948,989

[22] Filed: Oct. 4, 1978

[51] Int. Cl.² ............................................. B01F 3/04
[52] U.S. Cl. .................................. 261/90; 159/6 R; 202/236; 261/25; 261/89; 261/152
[58] Field of Search ..................... 261/25, 84, 88–90, 261/112, 142, 152, 155, 156; 159/6 R; 202/236; 203/89; 196/112

[56] References Cited

U.S. PATENT DOCUMENTS

| 621,718 | 3/1899 | Seymour, Jr. ..................... 261/25 X |
| 831,941 | 9/1906 | Erlinger ............................ 261/84 X |
| 2,944,801 | 7/1960 | Katz et al. ......................... 261/90 X |
| 3,881,875 | 5/1975 | Brieger et al. .................... 261/89 X |
| 4,038,353 | 7/1977 | Shafranovsky et al. ............... 261/89 |
| 4,065,346 | 12/1977 | Evkin et al. ......................... 159/6 R |

FOREIGN PATENT DOCUMENTS 859097  1/1961  United Kingdom ...................... 261/89

Primary Examiner—Richard L. Chiesa
Attorney, Agent, or Firm—Haseltine, Lake & Waters

[57] ABSTRACT

The invention relates to an apparatus for heat-mass exchange processes with participation of a liquid, comprising at least one sprinkling device installed in the casing with a provision for rotation around its own axis and made up from chutes curved into a multiple-start spiral diverging from the axis of the sprinkling device. At least the peripheral portions of at least two chutes, as they gradually recede from the axis of the sprinkling device, are displaced in a direction parallel to the axis of the sprinkling device so that the peripheral ends of the chutes are arranged in different planes which are perpendicular to the axis of the sprinkling device.

8 Claims, 6 Drawing Figures

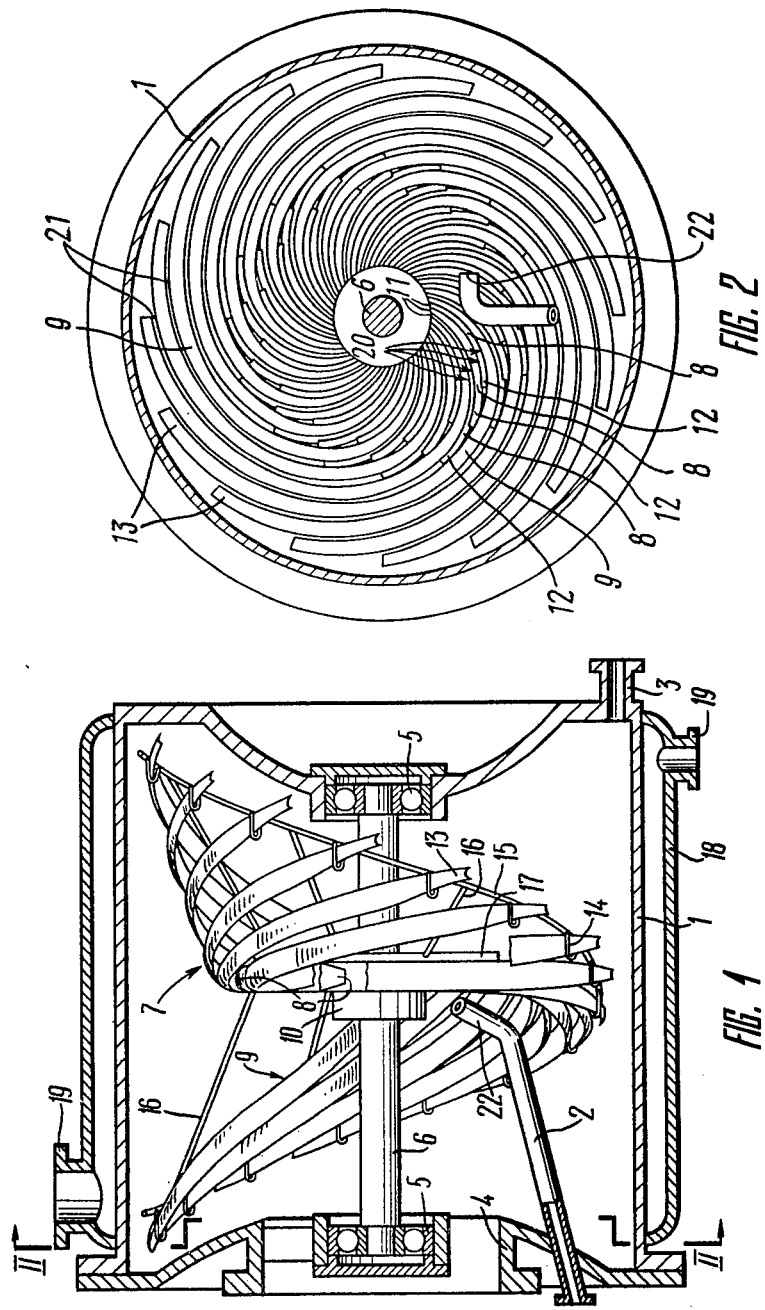

APPARATUS FOR HEAT-MASS EXCHANGE PROCESSES WITH PARTICIPATION OF LIQUID

The present invention relates to the equipment for heat-mass exchange processes with participation of a liquid, for example for vaporizing a liquid in a film, distillation, rectification, chemical reactions involving the liberation of heat, for cooling and heating gases and liquids, absorption, and moistening of gases. The most preferable field of application of the present invention is inspissation and distillation of materials sensitive to elevated temperatures, e.g. lactams, fatty acids, polyhydric, alcohols, ethanolamines, high-boiling ethers, various oils, food and pharmaceutical products.

Known in the prior art is an apparatus for heat-mass exchange processes with participation of a liquid comprising a casing with means for admitting the source materials taking part in the process and discharging the final products, said casing incorporating several sprinkling devices installed rotatably around their axes, and means connected to the casing and intended to deliver a liquid to the central portions of the sprinkling devices. Each of said sprinkling devices consists of a number of chutes connected to one another and curved in the form of a multiple-start spiral diverging from the axis of the sprinkling device. The chutes of each sprinkling device are clamped between the horizontal radially-mounted bars which are rigidly connected with the central mounting sleeve. The peripheral ends of the chutes of the sprinkling device are of a tapering shape and are located in one and the same plane which is set perpendicularly to the axis of the sprinkling device. The prior art apparatus has a vertical shaft on which said sprinkling devices are mounted one above another. Besides, the prior art apparatus is provided with means for transferring the liquid from one sprinkling device to another. These means have the form of circular pockets secured to the internal side wall of the casing and intended to receive the liquid thrown off the sprinkling devices, and of overflow trays located in the space between the sprinkling devices. The receiving ends of the trays communicate with the circular pockets for receiving the liquid flowing down from the overlying sprinkling devices. The discharge ends of the trays are located above the underlying sprinkling devices. Thus, said trays function as the means for delivering the liquid to the central portions of the sprinkling devices.

The casing of the apparatus may have a jacket on the outside to contain a heat carrier or a refrigerant.

During operation of the known apparatus the liquid enters the central portion of each sprinkling device which rotates around its axis. Acted upon by the centrifugal forces, the liquid gets into the hollows of the spirally-curved chutes. Then the liquid flows along the hollow of the chute over a spiral trajectory from the centre to the periphery of the sprinkling device. From the periphery of the rotating sprinkling device the liquid is thrown onto the internal surface of the apparatus casing in the form of drops and sprays. The casing and the axis of the sprinkling device being vertical, the liquid flows down by gravity in the form of a film over the internal surface of the casing. On the way, the film is vigorously agitated on a narrow circular strip of the internal casing wall which envelops directly the periphery of the sprinkling device.

The apparatus can be utilized for providing contact between a gas and a liquid which is necessary in such processes as rectification, absorption, moistening and cooling of gases, and cooling of liquids due to partial evaporation into the gas flow. In this case the gas enters the apparatus through a branch pipe in the lower part of the casing, crosses all the sprinkling devices passing through the gaps between the chutes and is discharged from the apparatus through a branch pipe in the upper part of the apparatus casing. The liquid is delivered through the upper branch pipe onto the uppermost sprinkling device. The liquid thrown off the downmost sprinkling device is discharged from the apparatus through a branch pipe in the lower part of the casing. The heat-and-mass exchange between the gas and liquid in the column takes part in the gaps between the chutes, in the cloud of spray filling the space between the sprinkling devices and the walls of the casing, as well as on the surface of the film which moistens the internal surface of the casing.

If the casing has an external jacket with circulating heat carrier or refrigerant, it becomes possible to carry out the processes of cooling, heating or vaporizing the liquid film on the internal surface of the casing. In this case, when the apparatus is used only for heating a liquid, it is possible to dispense with the means for delivering and discharging the gas phase. If the apparatus is used for vaporizing a liquid, it has to be provided with a branch pipe for the discharge of the gas (vapour) phase in which case there is no necessity, naturally, for the branch pipe delivering the gas phase into the apparatus.

A disadvantage of the known apparatus for heat-mass exchange processes with participation of a liquid lies in a narrow-localized liquid spray thrown from the sprinkling device. When the apparatus is utilized to provide contact between the gas and liquid, this is manifested by the insufficiently developed disperse contact surface formed by the sprinkling device.

If the apparatus is used as an evaporator, the narrow-localized liquid spray causes an insufficiently high agitation of the liquid film flowing down over the heated internal surface of the casing. The liquid film is intensively agitated only on the narrow circular strip of the casing internal surface, said strip directly enveloping the periphery of the sprinkling device. Meanwhile, a considerable proportion of the casing walls is covered with a quietly-flowing nonturbulized film of liquid. This reduces the local intensity of heat exchange between the hot wall of the casing and the liquid film.

An object of the invention resides in improving the efficiency of the process of heat-mass exchange.

The essence of the invention lies in providing an apparatus for heat-mass exchange processes with participation of a liquid, comprising a casing with the means for admitting the source materials taking part in the process and discharging the final products, said casing incorporating at least one sprinkling device installed rotatably around its own axis and consisting of chutes curved in the form of a multiple-start spiral diverging from the axis of the sprinkling device, the coils of said spiral being spaced at certain distances from one another, and a means delivering a liquid to the central portion of said sprinkling device wherein, according to the invention, at least the peripheral portions of at least two chutes arranged gradually farther from the axis of the sprinkling device are displaced in the direction parallel to the axis of the sprinkling device so that the peripheral ends of the chutes are located in different planes which are perpendicular to the axis of the sprinkling device.

The use of such a sprinkling device in the mass exchange apparatus gives a developed surface of contact between the liquid and gas due to the formation of a cloud of spray throughout the working volume of the apparatus. This increases the efficiency of mass exchange.

The employment of such a sprinkling device in an apparatus provided with a jacket for circulation of a heating or cooling fluid improves the distribution and stirring of the liquid on the wetted surface of the jacket. This raises the coefficient of heat transfer between the liquid film and the wetted surface.

It is desirable that the discharge portions of the peripheral ends of the chutes of the sprinkling device should be tapering and set at different angles to the plane which is perpendicular to the axis of the sprinkling device. This will ensure more accurately directed and controlled discharge of the liquid from the sprinkling device. Such a design of the sprinkling device in a mass exchange apparatus widens the possibility of shaping the spray in the desired direction. In a heat-exchange apparatus that is conducive to a more uniform distribution of liquid over the heated surface.

It is desirable that the sprinkling device should comprise chutes whose peripheral ends are located at different distances from the axis of the sprinkling device and which are arranged around the axis in a periodically alternating sequence so that the peripheral ends of the chutes lying nearer to the axis of the sprinkling device are brought approximately to the middle portions of the adjacent chutes whose peripheral ends are located farther from the axis of the sprinkling device.

In this case it would be possible to increase the number of the chutes beginning in the central portion of the sprinkling device as compared with the number of the chutes ending at the periphery of the sprinkling device which, in turn, would make it possible to deliver the liquid directly onto the central ends of the chutes without the use of special distributing sleeves because the holding ability of the chutes grows with the increase in their number. This facilitates the delivery of the liquid to the central portion of the sprinkling device and rules out its premature discharge from the sprinkling device.

It is also desirable that the gaps between the adjacent chutes in the plane perpendicular to the axis of the sprinkling device would be smaller in its central portion than at its periphery. This will also facilitate the delivery of liquid to the sprinkling device and reduce the consumption of the construction material by increasing the gaps at that part of the sprinkling device (at its periphery) where the size of the gaps exerts no influence on the functioning of the apparatus.

It is also practicable that the means for the delivery of liquid to the central portion of the sprinkling device should be made in the form of a branch pipe set at such an angle to the inner surface of the chutes as to ensure rotation of the sprinkling device under the force of the liquid spray flowing out of said branch pipe. In this case it is possible to do without a special drive for rotating the sprinkling device around its axis. The kinetic energy of the liquid spray flowing at a sufficiently high velocity through said branch pipe will ensure rotation of the sprinkling device in the process of collision between the spray and the chutes.

It is desirable that the axis of the sprinkling device should be oriented vertically and the peripheral portions of the chutes of the sprinkling device should displace down as they recede from the axis of the sprinkling device. In this case the liquid is accelerated in the chutes not only by the centrifugal force arising in the course of rotation of the sprinkling device but by the force of gravity too. The share of the force of gravity in accelerating the liquid on the chutes of the rotating sprinkling device grows with the reduction in the angular velocity of said device and with the lowering of the peripheral ends of the chutes. The velocity with which the drops and sprays of liquid fall on the sprinkled surface is equal to the geometrical sum of the linear velocity of the peripheral end of the chute and the velocity of the liquid relative of the chute; the latter component of velocity has a decisive importance at low rotation speeds of the sprinkling device. Thus, the apparatus according to the invention, as compared with the known apparatus, ensures at low angular speeds of the sprinkling device a higher velocity of the liquid drops and sprays at the moment of their falling on the sprinkled surface and, as a result, a higher degree of turbulization of the liquid film through the use of the force of gravity for additional acceleration of the liquid on the chutes of the sprinkling device. As a consequence, the efficiency of heat or mass exchange on the sprinkled surface of the apparatus is increased.

It is likewise desirable that the chutes of the sprinkling device should have gaps dividing them into a number of successive sections, the sections of the chutes located nearer to the axis of the sprinkling device being arranged in a common plane perpendicular to the axis of the sprinkling device, forming a flat spiral and having discharge outlets onto the adjacent sections of the chutes located farther from the axis of the sprinkling device. This facilitates the manufacture of the sprinkling device.

It is desirable that the sprinkling device should comprise separate groups of chutes differing in the remoteness of their central ends from the axis of the sprinkling device and that the means for delivering the liquid to the central portion of the sprinkling device should be made in the form of distributing appliances which ensure the discharge of liquid onto the separate groups of chutes.

The distributing appliances can be used for delivering liquids of different chemical nature on the different groups of the chutes in one and the same sprinkling device. In this way the construction of the apparatus allows various chemical reagents to be mixed directly on the cooled surface of the casing at the moment of liberation of reaction heat. Such an apparatus is highly effective for exothermic chemical reactions. Its employment will prevent an excessive rise in the temperature of the reaction mixture.

Now the invention will be described in detail by way of examples with reference to the accompanying drawings in which:

FIG. 1 is a longitudinal section of the apparatus for heat-mass exchange processes with participation of a liquid according to the invention;

FIG. 2 is a section taken along line II—II in FIG. 1;

Figure 3:
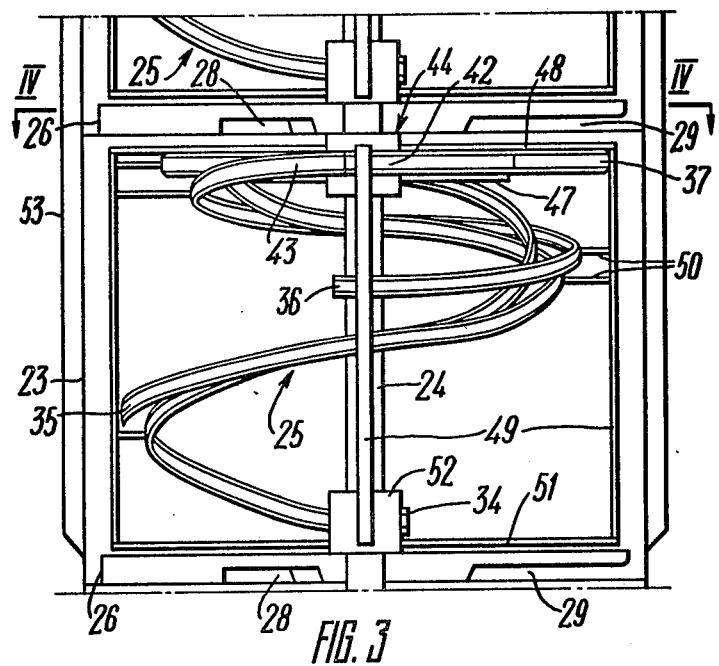
FIG. 3 is a longitudinal section of the apparatus for heat-mass exchange processes with participation of a liquid comprising a number of sprinkling devices and means for the transfer of the liquid between the sprinkling devices according to the invention.

The apparatus for heat-mass exchange processes with participation of a liquid specially adapted for boiling out a liquid comprises a horizontal cylindrical casing 1 (FIG. 1) with means for admitting the source materials taking part in the process and discharging the final products. These means include a branch pipe 2 for delivering the liquid to be vaporized into the apparatus, a branch pipe 3 for discharging the nonevaporated liquid, and a branch pipe 4 for letting out the formed vapours. Installed rotatably and coaxially in the casing 1 on bearings 5 is a horizontal shaft 6 which carries a sprinkling device 7. Said device consists of chutes 8 and 9 (FIGS. 1, 2) of different lengths, connected with a central mounting sleeve 10 (FIG. 1) and curved into a multiple-start spiral diverging from said sleeve. All the shorter chutes 8 throughout their length, including their central ends 11 (FIG. 2) and peripheral ends 12 lie in one and the same cross section of the casing 1, forming a flat Archimedean screw. The peripheral portions of the chutes 9 gradually receding from the axis of the sprinkling device 7 are displaced parallel to the axis of the sprinkling device i.e. to the shaft 6 so that the peripheral ends 13 of the chutes 9 are positioned in different planes which are perpendicular to the axis of the sprinkling device. During rotation of the sprinkling device this must ensure a wide liquid spray.

The peripheral ends 13 of the longer chutes 9 are secured by clips 14 to a helical rib 15. The latter is connected by links 16 to a disc 17 located under the chutes 8 and 9. The disc 17 is connected with the central mounting sleeve 10 of the sprinkling device 7. The chutes 8, 9 are also connected with the central mounting sleeve 10 by the disc 17. The peripheral ends 13 of the chutes 9 are tapered down at the discharge portion and are set at different angles to the plane which is perpendicular to the shaft 6. This must ensure controllable discharge of the liquid from the chutes 9 of the sprinkling device 7 onto the walls of the casing 1 which is provided on the outside with a heated jacket 18 with branch pipes 19 for letting the heat carrier in and out. The peripheral ends 12 (FIG. 2) of the shorter chutes 8 are located at a smaller distance from the shaft 6 than are the peripheral ends 13 of the longer chutes 9. The shorter and longer chutes 8 and 9 are arranged around the sleeve 10 in a periodically alternating sequence. The peripheral ends 12 of the shorter chutes 8 are brought approximately to the central portions of the adjacent longer chutes 9. The number of starts of the spiral in the centre of the sprinkling device 7 shown in FIGS. 1 and 2 is equal to 64 while at its periphery it is equal to 16. The gaps 20 (FIG. 2) between the adjacent chutes 8 and 9 in the central part of the sprinkling device 7 are smaller than the gaps 21 at its periphery.

The branch pipe 2 (FIG. 1) for the delivery of the liquid into the apparatus serves also as a means for delivering the liquid to the central portion of the sprinkling device 7. The end 22 of the branch pipe 2 is brought close to the centre of the sprinkling device 7. Said end 22 is set at an acute angle to the plane of cross section of the casing 1 and at an angle to the inner surface of the chutes 8 and 9. With respect to the axis of the sprinkling device 7 the end 22 of the branch pipe 2 is directed so that the trajectory of the liquid spray flowing under pressure out of the branch pipe does not cross said axis. In this case the kinetic energy of the liquid spray flowing out of the branch pipe 2 is converted into rotation of the sprinkling device 7.

Figure 4:
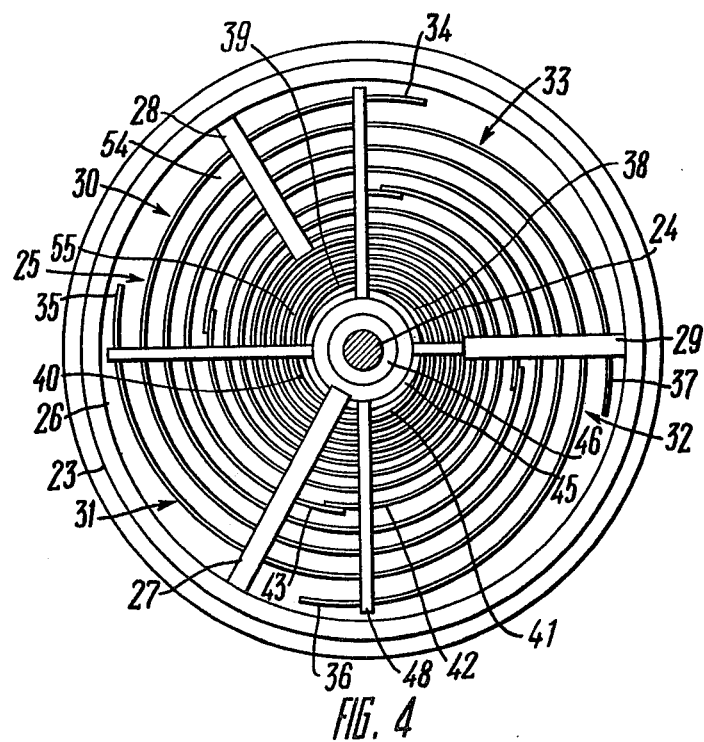
FIG. 4 is a section taken along line IV—IV in FIG. 3.

The apparatus for heat-mass exchange processes with participation of a liquid according to the present invention and comprising several sprinkling devices arranged coaxially one above another has a vertical cylindrical casing 23 (FIG. 3) in which is installed coaxially and rotatably a vertical shaft 24 carrying the sprinkling devices 25. The drawing shows for convenience only that part of the apparatus and does not illustrate the means which deliver the source materials taking part in the process and discharge the final products. For transferring the liquid from one sprinkling device 25 to another the apparatus comprises the means consisting of circular pockets 26 and overflow trays 27, 28, 29 (FIG. 4). The latter also serve for delivering the liquid to the central portion of the sprinkling devices 25.

The sprinkling device 25 is made up of chutes 30, 31, 32, 33 twisted around the shaft 24 in the form of a multiple-start spiral.

The peripheral ends 34, 35, 36, 37 of the chutes 30, 31, 32, 33 are located at different levels. The central ends 38, 39, 40, 41 of the chutes 30, 31, 32, 33 lie on one and the same level. Approximately in the middle portion the chutes 30, 31, 32, 33 have gaps which divide them into successive sections 42 and 43. Taken together the sections 42 of the chutes 30, 31, 32, 33 form a four-start spiral developed in a horizontal plane, i.e. a flat spiral. The sections 43 of the chutes 30, 31, 32, 33 taken together also form a four-start spiral but are inclined down so that the liquid in the rotating sprinkling device 25 not only moves away from the shaft 24 but also goes down from the horizontal surface on which are located the sections 42 of the chutes 30, 31, 32, 33, which means that the peripheral portions of the chutes 30, 31, 32, 33 are displaced down as they gradually recede from the axis of the sprinkling device 25. This shape of the sprinkling device 25 is favourable in that acceleration of the liquid on the spiral chutes 30, 31, 32, 33 is attained not only by the centrifugal force but by the force of gravity too. The relative share of the force of gravity in the acceleration of liquid on the chutes 30, 31, 32, 33 grows with the reduction of the rotation speed of the shaft 24 and the lowering of the peripheral ends 34, 35, 36, 37 of the chutes 30, 31, 32, 33. The velocity of the liquid drops and sprays falling on the sprinkled internal surface of the casing 23 is equal to the geometrical length of the linear velocity of the peripheral ends 34, 35, 36, 37 of the chutes 30, 31, 32, 33 and of the velocity of the liquid relative to the chute 30, 31, 32, 33, the last component of the velocity being a decisive factor at low angular rotation speeds of the sprinkling device 25. The flat spiral consisting of the sections 42 of the chutes 30, 31, 32, 33 is secured on a circular sleeve 44 (FIG. 3) which has an outer side wall 45 (FIG. 4) and a central mounting sleeve 46 by means of radial ribs 47, 48 (FIG. 3). One of the trays 27 (FIG. 4) is intended to deliver liquid into the circular sleeve 44. The trays 28, 29 deliver the liquid directly onto the sections 42 of the chutes 30, 31, 32, 33. Thus, the overflow trays 27, 28, 29 perform the functions of the means for delivering the liquid to the central portion of the sprinkling device 25. The sections 43 of the chutes 30, 31, 32, 33 are secured by longitudinal bars 49 (FIG. 3) and radical straps 50 connected with the bars 49. At the point of the joint the sections 42 and 43 are connected to the radial ribs 48. Said joints provide for the passage of the liquid from the sections 42 onto the sections 43 of the chutes 30, 31, 32, 33 (FIG. 4). The longitudinal bars 49 (FIG. 3) are connected by radial ribs 48 with the circular sleeve 44 and, by means of the radial ribs 51, with the mounting sleeve 52. The sprinkling device 25 is mounted on the shaft 24 with the aid of the circular sleeve 44 and the mounting sleeve 52. If the apparatus casing 23 is provided with an external jacket 53 for a heat carrier circulating inside, the apparatus can be used not only for heat and mass exchange but also for vaporizing the liquid on the inner surface of the casing 23. When the apparatus is employed mainly as an evaporator, there is no need to retain identical gaps between the chutes 30, 31, 32 and 33 (FIG. 4) in the plane perpendicular to the shaft 24. For example, the gaps 54 between the peripheral ends 34, 35, 36, 37 of the chutes 30, 31, 32, 33 are considerably larger than the gaps 55 between the central ends 38, 39, 40, 41 of the same chutes 30, 31, 32, 33.

The apparatus for heat-mass exchange processes with participation of a liquid realized according to the present invention, in a modification specially adapted for exothermic reactions comprises a vertical casing 56 (FIG. 5) with branch pipes 57, 58 for admitting various liquid reagents, a branch pipe 59 for discharging the reaction mixture and a branch pipe 60 for discharging the gases or vapours produced in the course of the chemical reaction. Installed rotatably and coaxially in the casing 56 on bearings 61 is a vertical shaft 62. Said shaft 62 carries a sprinkling device 63. The liquid-delivery branch pipes 57, 58 belong at the same time to the means designed to deliver the liquid to the central part of the sprinkling device 63. The sprinkling device 63 is made up of chutes 64 and 65 (FIGS. 5, 6) arranged in a periodically alternating sequence around the shaft 62.

Figure 5:
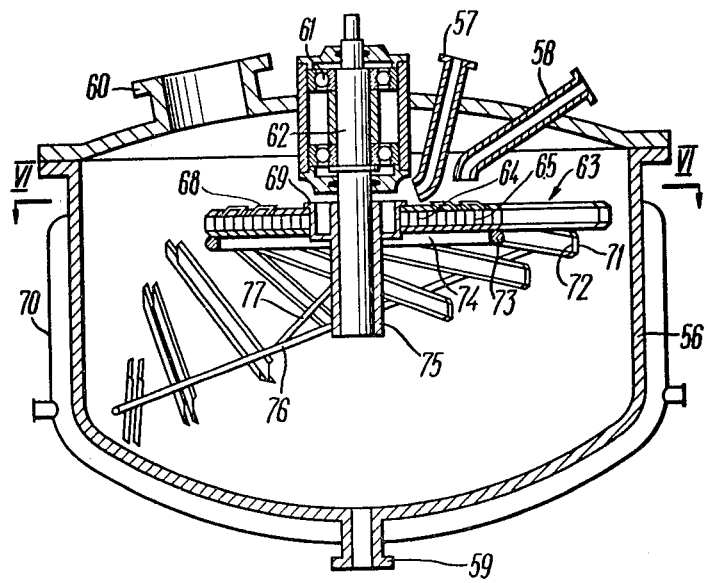
FIG. 5 is a longitudinal section of the apparatus for heat-mass exchange processes with participation of a liquid adapted for exothermic chemical reactions according to the invention.
Figure 6:
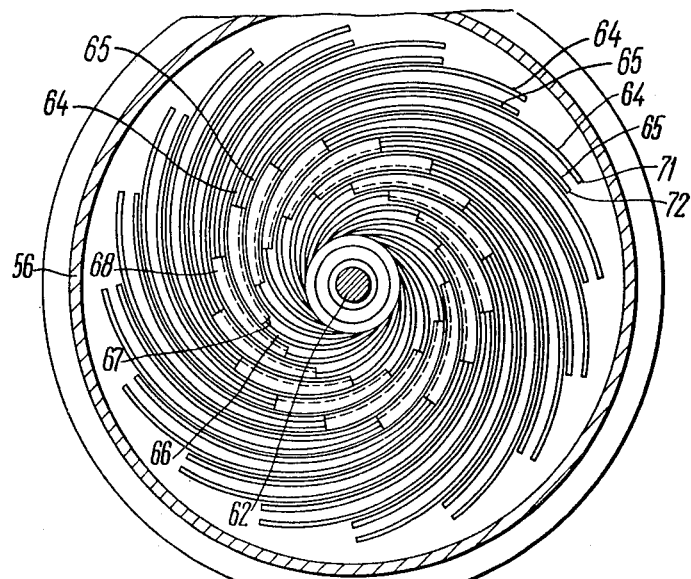
FIG. 6 is a section taken along line VI—VI in FIG. 5.

The chutes 64 and 65 differ from each other in the first place by the fact that their respective central ends 66 and 67 (FIG. 6) are arranged at different distances from the shaft 62. The gaps between the chutes 64 and 65 are partly covered, at least from above, by deflectors 68 (FIGS. 5, 6). Located in the centre of the sprinkling device 63 (FIG. 5) is a circular sleeve 69. The deflectors 68 together with the circular sleeve 69 and branch pipes 57, 58 constitute distributing appliances which ensure the draining of the liquid onto the two separate groups of chutes 64, 65 (one group combining the chutes 64 and the other, the chutes 65).

Indeed, inasmuch as the outlet end of the branch pipe 57 is located above the circular sleeve 69, it delivers the liquid only on the chutes 64 combined into a separate group. The other branch pipe 58 is brought to the deflectors 68 from above so that it can discharge liquid only on the central ends 67 (FIG. 6) of the chutes 65 which also constitute a separate group of the chutes.

The distributing appliances consisting of the deflectors 68, circular sleeve 69 (FIG. 5) and branch pipes 57, 58 and ensuring the discharge of the liquid onto the separate groups of the chutes perform the function of the means for the delivery of liquid to the central portion of the sprinkling device 63. The casing 56 is provided on the outside with a jacket 70 for the circulation of a cooling fluid, e.g. water, which is aimed at instant cooling of the liquid thrown off the peripheral ends 71, 72 of the chutes 64, 65. The peripheral ends 71, 72 of the adjacent chutes 64, 65 are combined in pairs so that the discharge edges of any one pair of chutes 64, 65 are directed at one and the same sprinkled portion of the internal surface of the casing 56. At the same time, the different pairs of the chutes 64, 65 have peripheral ends 71, 72 arranged on different cross sections of the casing 56. As a result, the liquids of different chemical nature are mixed directly on the cooled wall, on its entire surface for that matter. The central ends 66 (FIG. 6) of the chutes 64 are connected with the circular sleeve 69 (FIG. 5). The chutes 64, 65 are secured on the lower ring 73 which is connected by radial ribs 74 with the mounting sleeve 75 made integral with the circular sleeve 69. The peripheral ends 71, 72 of the chutes 64, 65 are connected with a helical partition 76 which, in turn, is secured on the mounting sleeve 75 with the aid of links 77.

The shape and arrangement of the apparatus casing bear no essential influence upon the realization of the present invention; therefore, said casing may be either cylindrical, conical, hemispherical or of any other configuration.

In plan view the chutes may form a multiple-start spiral of any type, i.e. Archimedean, logarithmic, hyperbolic, etc. Likewise, the direction of rotation of the sprinkling device may be selected to suit the actual realization of the apparatus according to the invention. The method of fastening the chutes is likewise not essential in the realization of the present invention, same as the shape of the chute cross section (trough-like, semicircular, etc.), and the orientation of the chute side edges relative to the axis of the sprinkling device.

The apparatus for heat-mass exchange processes with participation of a liquid illustrated in FIGS. 1, 2 functions as follows:

The liquid is delivered by a pump (not shown in the drawing) through the branch pipe 2 in the form of a solid high-velocity spray onto the inner surface of the chutes 8, 9 in the central portion of the sprinkling device 7. As a result, said device is set in rotation. The sense of rotation of the sprinkling device 7 is such that the peripheral ends 13 of the chutes 9 are oriented in the direction opposite to that of their movement. The liquid is moved by the centrifugal forces along the chutes 8, 9 and thrown off on the inner surface of the casing 1 which is heated from outside. Said surface becomes covered with a continuous film of liquid which is constantly agitated by the drops and sprays of liquid. A part of the liquid is used up in the process. The nonevaporated remaining liquid is discharged from the casing 1 through the branch pipe 3. The generated vapours are expelled from the casing 1 through the branch pipe 4. The apparatus can be used for, say, vaporizing the traces of water and low-boiling admixtures contained in a small proportion (2 to 5%) in the source material, e.g. crude caprolactam, at a residual pressure of 1–3 mm Hg.

The apparatus for heat-mass exchange processes with participation of a liquid illustrated in FIGS. 3, 4 functions as follows.

The shaft 24 is set in rotation by a drive not shown in the drawing. The peripheral ends 34, 35, 36, 37 (FIG. 4) of the chutes 30, 31, 32, 33 are oriented in the direction of their movement. The liquid flows over the overflow trays 27, 28, 29 onto the central part of the sprinkling device 25 either directly from above (trays 28, 29) or through the circular sleeve 44 (tray 27). Under the effect of centrifugal forces the liquid flows farther over the chutes 30, 31, 32, 33, is accelerated relative to said chutes and is thrown onto the inner walls of the casing 23 at an absolute velocity which is higher than the circumferential speed of the periphery of the sprinkling device 25. From the walls of the casing 23 the liquid flows down into the circular pocket 26 wherefrom it falls into the underlying overflow trays 27, 28, 29. From here the liquid is distributed over another sprinkling device 25. The vapour moves in the casing from the bottom up, contacting the liquid. In the case of rectification, mass-heat exchange takes place on the chutes 30, 31, 32, 33 in the cloud of spray and on the sprinkled wall of the casing 23. If the jacket 53 (FIG. 3) is filled with a heat carrier, the apparatus can function as an evaporator in which the liquid evaporates on the heated walls of the casing 23. The apparatus can be used, for example, for rectification of caprolactam under vacuum, or for distillation of caprolactam.

The functioning of the apparatus for carrying out exothermic reactions, illustrated in FIGS. 5, 6 can be illustrated by the reaction of regrouping cyclohexanonoxime into caprolactam. This reaction proceeds with liberation of heat and, if the heat is not immediately transferred from the reacting liquid mixture, the reaction may take a violent nature and even cause an explosion. Hence, it is practicable to carry out such a reaction in an agitated film on a cooled surface. The cooling fluid, e.g. water circulates in the jacket 70 (FIG. 5). The pressure inside the casing 56 is at the atmospheric level. The concentrated sulphuric acid flows through the branch pipe 58 onto the chutes 65. The concentrated solution of cyclohexanonoxime is supplied through the branch pipe 57 and the circular sleeve 69 onto the chutes 64.

On the cooled walls of the casing 56 the solution of oxime is mixed with sulphuric acid. The liquid reaction mixture forms a film on the walls of the casing 56. This film is agitated by the sprays and jets and is thus cooled down. This forms a product of regrouping of cyclohexanonoxime whose solution is discharged from the apparatus through the branch pipe 59.

What is claimed is:

1. An apparatus for heat-mass exchange processes employing a liquid, comprising: a casing; means for introducing process source materials into said casing and discharging the final products therefrom; at least one sprinkling device installed within said casing for rotation about its axis; chutes forming said sprinkling device, curved into a multiple-start spiral, diverging from the axis of said sprinkling device whereby hollows formed in said chutes are located on the concave side of the spiral; gaps being formed between coils of said sprial, and means for supplying a liquid to a central part of the sprinkling device, wherein: at least peripheral portions of at least two of said chutes gradually recede from the axis of said sprinkling device and are displaced in a direction parallel to the axis of said sprinkling device; and the other ends of said chutes are located in different planes perpendicular to the axis of said sprinkling device.

2. An apparatus as claimed in claim 1, wherein: the outer ends of said chutes are tapered and directed at different angles to a plane that is normal to the axis of said sprinkling device.

3. An apparatus as claimed in claim 1, wherein: said sprinkling device comprises chutes whose outer ends are disposed at different distances from the axis of the sprinkling device and arranged around the axis in a periodically alternating sequence; said outer ends of the chutes being closer to the axis of the sprinkling device, substantially reach the middle portions of adjacent chutes having outer ends located farther from the axis of the sprinkling device.

4. An apparatus as claimed in claim 3, wherein: the gaps between adjacent chutes in the plane perpendicular to the axis of the sprinkling device are smaller in the central part of said device than the gaps between the peripheral portions of the adjacent chutes.

5. An apparatus as claimed in claim 3, wherein: said sprinkling device comprises: separate groups of chutes having outer ends located at different distances from the axis of the sprinkling device, and said means for supplying liquid to the central part of the sprinkling device includes distributing appliances intended for separately directing the liquid to said separate groups of chutes.

6. An apparatus as claimed in claim 3, wherein: the means for supplying liquid to the central part of the sprinkling device is a pipe directed at an angle to the inner surface of the chutes, to cause rotation of the sprinkling device under the force of the stream of liquid flowing out of the pipe.

7. An apparatus as claimed in claim 1, wherein: the axis of the sprinkling device is oriented vertically and the peripheral portions of the chutes are displaced downward with distance from the axis of the sprinkling device.

8. An apparatus as claimed in claim 1, wherein: said chutes have gaps dividing the chutes into a series of successive portions, whereby the portions of the chutes located closer to the axis of the sprinkling device are disposed in a common plane perpendicular to the axis of the sprinkling device and form a flat spiral having outlets directed onto the portions of the chutes located farther from the axis of the sprinkling device which form the peripheral portions of said chutes.

* * * * *